US006631653B2

(12) United States Patent
Brickner et al.

(10) Patent No.: US 6,631,653 B2
(45) Date of Patent: Oct. 14, 2003

(54) SYSTEM FOR DEFINABLE SINGLE LEVER CONTROL SHIFT PATTERN JOINT

(75) Inventors: Chad T. Brickner, Aurora, IL (US); John R. Connolly, Clayton, NC (US); Paul Gilbert, Port Washington, WI (US); Thomas J. Hajek, Jr., Lockport, IL (US); Rudy V. Mills, Joilet, IL (US); David P. Smith, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 09/731,684

(22) Filed: Dec. 6, 2000

(65) Prior Publication Data

US 2002/0066329 A1 Jun. 6, 2002

(51) Int. Cl.[7] .......................... F16H 59/00; F16C 11/06; G05G 1/00

(52) U.S. Cl. .............................. 74/471 XY; 74/473.33; 403/57

(58) Field of Search ........................ 74/471 XY, 473.21, 74/473.33; 403/53, 57; 137/636.2

(56) References Cited

U.S. PATENT DOCUMENTS

| | | | | | |
|---|---|---|---|---|---|
| 3,176,805 | A | * | 4/1965 | Gandy | 403/57 |
| 3,377,088 | A | * | 4/1968 | Millay | 403/57 |
| 3,832,073 | A | * | 8/1974 | Castellanos | 403/58 |
| 4,098,286 | A | | 7/1978 | Prime | |
| 4,133,251 | A | | 1/1979 | Agge et al. | |
| 4,375,631 | A | | 3/1983 | Goldberg | |
| 4,667,909 | A | | 5/1987 | Curci | |
| 5,002,241 | A | | 3/1991 | Tizac | |
| 5,209,263 | A | | 5/1993 | Hori | |
| 5,224,589 | A | * | 7/1993 | Karakama et al. | 74/471 XY |
| 5,576,704 | A | | 11/1996 | Baker et al. | |
| 5,675,359 | A | | 10/1997 | Anderson | |
| 5,689,996 | A | * | 11/1997 | Ersoy | 74/473.33 |
| 5,692,541 | A | | 12/1997 | Brown | |
| 5,927,150 | A | * | 7/1999 | Hirano et al. | 74/473.33 |
| 5,979,268 | A | | 11/1999 | Freberg et al. | |
| 6,213,244 | B1 | * | 4/2001 | Waggoner et al. | 74/471 XY |

* cited by examiner

*Primary Examiner*—William C. Joyce
(74) *Attorney, Agent, or Firm*—Howard & Howard; Steven M. Hanley

(57) ABSTRACT

A single lever control assembly that limits motion due to the inherent design of the assembly. In other words, no additional components are required to limit the motion of the single lever control assembly. The assembly includes two U-shaped members each having a base and parallel legs extending from the base, a lever connected to one of the U-shaped members and a pivot block interconnecting the parallel legs for allowing the U-shaped members to rotate relative to one another. The assembly has at least one of the parallel legs having a projection that engages one of the parallel legs of the other U-shaped member. In general, the single lever control assembly is a type of modified universal joint whose movement is limited by a projection.

17 Claims, 5 Drawing Sheets

SYSTEM FOR DEFINABLE SINGLE LEVER CONTROL SHIFT PATTERN JOINT

TECHNICAL FIELD

This invention relates generally to a single lever control assembly for controlling a machine and more particularly to a control shift pattern joint.

BACKGROUND ART

Single lever control assemblies of the type known for controlling a machine typically comprise two U-shaped members each having a base and parallel legs extending along spaced longitudinal axes from the base to respective distal ends, a lever supported by one of the U-shaped members, and a pivot block interconnecting the parallel legs. Typically, the range of motion of a single lever control assembly includes a plus pattern and 360° rotation, i.e., a swiveling motion.

The pivot block allows the U-shaped members to rotate relative to one another about transverse first and second axes to obtain the plus pattern. In other words, the parallel legs of the first U-shaped member rotate about the first axis when the legs of the first U-shaped member move between the parallel legs of the second U-shaped member. Also, the parallel legs of the first U-shaped member rotate about the second axis when the parallel legs of the first U-shaped member move about the legs of the second U-shaped member. The 360° of rotation occur because all the legs of the U-shaped members terminate within a radius of clearance about the axes.

Typically, single lever control assemblies rotate in a plus pattern and in a 360° pattern when viewed from above the single lever control assembly. Specific functions are activated and deactivated by moving the single lever control assembly to certain positions. Generally, a specific function is activated at each endpoint of the plus pattern. Two functions can be activated simultaneously by rotating the single lever control about the 360° pattern to the midpoint position between the two desired functions.

A disadvantage of using this type of single lever control assembly is that additional components need to be added to limit the range of motion of the lever assembly. Typically, a plate is used to limit the range of motion. For instance, the plate could be either flat or rounded and is placed over the single lever control assembly. Each plate includes a cutout portion or slot in the areas where movement of the single control lever is allowed or desired. One example of such an apparatus is disclosed in U.S. Pat. No. 4,133,251. In that example, the lever is movable laterally in two generally perpendicular directions via a slotted gate pattern.

Another disadvantage of this type of single lever control assembly is that there is an additional expense in manufacturing the plates. Yet another disadvantage is the time required to properly install such a plate. Finally, there is always the possibility that the plate will slip out of position resulting in unrestricted movement of the single lever control.

Therefore, it is desirable to limit the 360° motion of the single lever control assembly without requiring extra structural elements. The present invention is directed to overcome one or more of the problems as set forth above.

DISCLOSURE OF THE INVENTION

The invention relates to a single lever control assembly for controlling a machine. The single lever control comprises two U-shaped members each having a base and supporting spaced parallel legs, a lever connected to one of the U-shaped members, and a pivot block interconnecting the parallel legs of the two U-shaped members. The single lever control assembly is characterized by at least one of the legs of one of the U-shaped members having a projection engaging one of the parallel legs of the other U-shaped member to limit rotation.

BEST MODE FOR CARRYING OUT THE INVENTION

Figure 1:
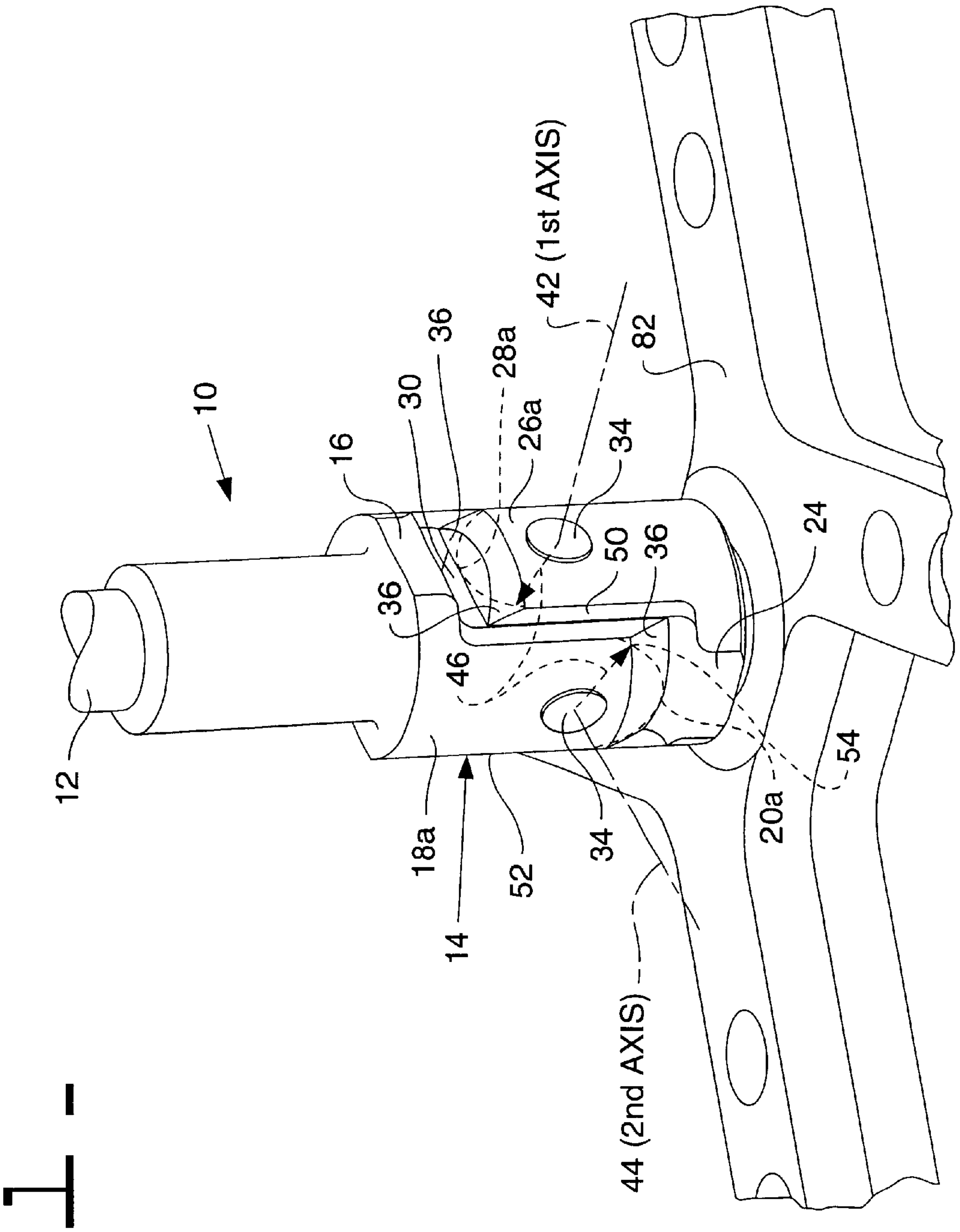
FIG. 1 is a perspective view of one embodiment of the single lever control assembly of the subject invention.

Referring to the drawings where like numerals indicate like or corresponding parts throughout the several views, a single lever control assembly for controlling a machine is generally shown at 10. A single lever control assembly is also commonly known as a joystick. The types of machines controlled by the single lever control assembly 10 of the present invention include, but are not limited to, loaders, excavators, tractors, winches and/or rippers.

Figure 2:
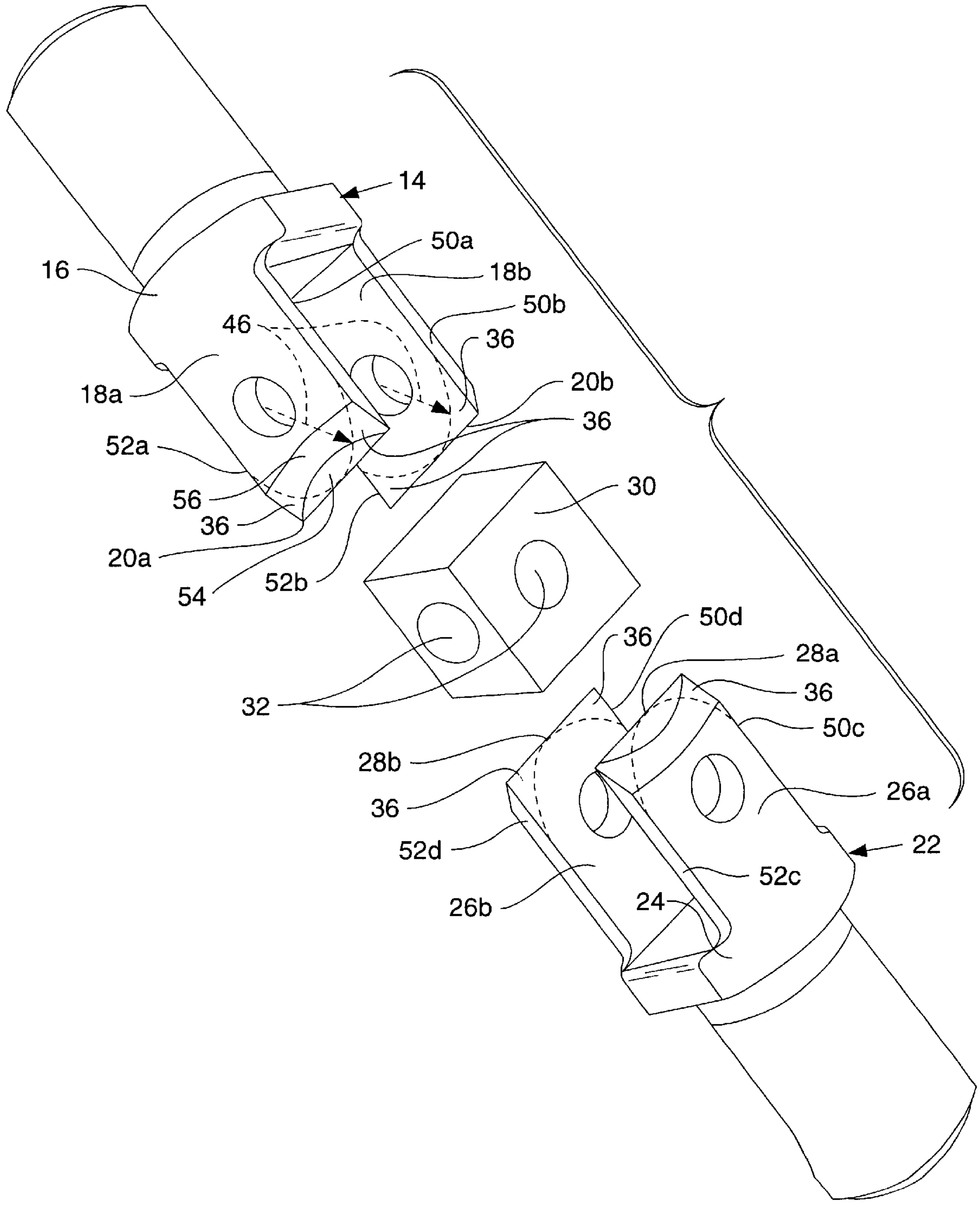
FIG. 2 is an exploded perspective view of the embodiment shown in FIG. 1.

As shown in FIGS. 1 and 2, the assembly 10 comprises a single lever 12 and a first U-shaped member, generally indicated at 14, having a base 16 supporting the lever 12. Parallel legs 18(*a*), 18(*b*) extend along spaced longitudinal axes from the base 16 to respective distal ends 20(*a*), 20(*b*).

The assembly 10 also comprises a second U-shaped member, generally indicated at 22. The second U-shaped member 22 also has a base 24 and parallel legs 26(*a*), 26(*b*) extending along spaced longitudinal axes from the base 24 to respective distal ends 28(*a*), 28(*b*).

As shown in FIG. 2, a pivot block 30 interconnects the parallel legs 18(*a*), 18(*b*), 26(*a*), 26(*b*) for allowing the first U-shaped member 14 to rotate relative to the second U-shaped member 22. Further, the pivot block 30 has a square cross-section and contains two transverse holes 32 for receiving pins 34 that connect the U-shaped members 14, 22 to the pivot block 30.

There is also typically an actuating plate attached to the first U-shaped member 22 (not shown). The actuating plate functions to engage respective valve elements responsive to movement of the single lever 12. Engagement of the valve elements causes performance of desired functions associated with the machinery being controlled by the joystick.

The second U-shaped member 22 is stationary because it is connected to a base member that attaches to the machinery the lever is controlling. The base member is shown as an X-shaped support bracket 82 in FIG. 1.

The single lever control assembly 10 is characterized by at least one of the parallel legs 18(*a*), 18(*b*), 26(*a*), 26(*b*) of one of the U-shaped members 14, 22 having a projection 36 engaging one of the parallel legs 18(*a*), 18(*b*), 26(*a*), 26(*b*)

of the other U-shaped member 14, 22 to limit rotation. The projection extends beyond the leg's 18(*a*), 18(*b*), 26(*a*), 26(*b*) radius 46 of clearance which is a reference radius that extends about the first and second axes 42, 44. It is recognized that the projection could have various shapes or contours to obtain various operating characteristics.

As discussed previously, a 360° pattern of the single lever 12 is achieved when the end 20(*a*), 20(*b*), 28(*a*), 28(*b*) of each leg 18(*a*), 18(*b*), 26(*a*), 26(*b*) terminates at or within the reference radius 46. In that case, each leg clears the parallel legs 18(*a*), 18(*b*), 26(*a*), 26(*b*) of the opposite U-shaped member 14, 22 in all degrees of rotation between the U-shaped members 14, 22. In the prior art single lever control assemblies, the distal ends of all of the parallel legs terminate at or within the reference radius of clearance 46. In the present invention, rotation of the single lever control assembly 10 is limited because at least one of the parallel legs has a projection 36 that extends, at least in part, beyond the reference radius 46.

Figure 3:
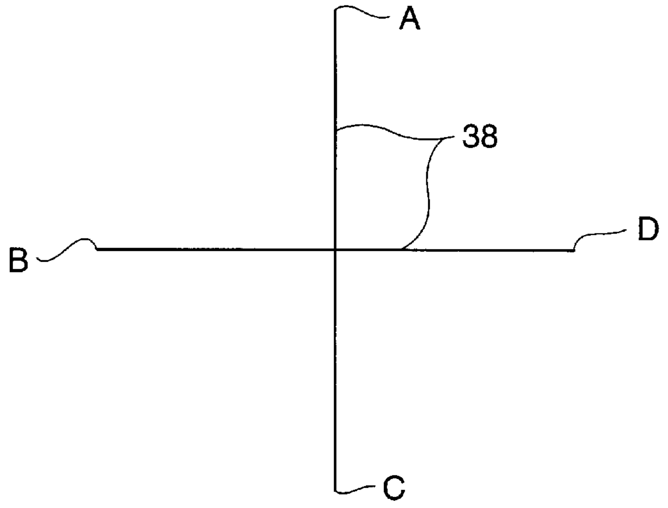
FIG. 3 is a top view of the range of motion of the embodiment shown in FIG. 1.

The plus pattern 38 illustrated in FIG. 3 is achieved when the first U-shaped member 14 is limited to rotate only relative to the second U-shaped member 22 about transverse first and second axes 42, 44 (see FIG. 1). The first U-shaped member 14 rotates about the first axis 42 when the parallel legs 18(*a*), 18(*b*) of the first U-shaped member 14 rotate between the parallel legs 26(*a*), 26(*b*) of the second U-shaped member 22. The first U-shaped member 14 rotates about the second axis 44 when the parallel legs 18(*a*), 18(*b*) of the first U-shaped member 14 rotate about the parallel legs 26(*a*), 26(*b*) of the second U-shaped member 22.

In the embodiment of FIGS. 1 and 2, each of the parallel legs 18(*a*), 18(*b*), 26(*a*), 26(*b*) includes a reference radius of clearance 46 extending about the first and second axes 42, 44. Further, all four legs 18(*a*), 18(*b*), 26(*a*), 26(*b*) of the single lever control assembly 10 have at least one projection 36 to limit movement. In other words, there are a plurality of projections 36 extending beyond the reference radius 46, each projection 36 on a different parallel leg 18(*a*), 18(*b*), 26(*a*), 26(*b*). Each projection 36 extends parallel to the longitudinal axis of the parallel leg 18(*a*), 18(*b*), 26(*a*), 26(*b*) of the projection 36 it extends from. Alternatively, the projection 36 extends transverse to the longitudinal axis of the parallel leg 18(*a*), 18(*b*), 26(*a*), 26(*b*). As previously noted, the projections 36 do not have to extend to a point as illustrated in the drawings. It is recognized that various contours could be used without departing from the essence of the subject invention.

Each parallel leg 18(*a*), 18(*b*), 26(*a*), 26(*b*) includes parallel spaced sides 50(*a*), 52(*a*), 50(*b*), 52(*b*), 50(*c*), 52(*c*), 50(*d*), 52(*d*) extending from the base 16, 24 to a distal end 20(*a*), 20(*b*), 28(*a*), 28(*b*). As shown in FIG. 2, in the first U-shaped member 14 leg 18(*a*) includes parallel spaced sides 50(*a*) and 52(*a*) that terminate at distal end 20(*a*). Leg 18(*b*) includes parallel spaced sides 50(*b*) and 52(*b*) that terminate at distal end 20(*b*). On the second U-shaped member 22, leg 26(*a*) includes parallel spaced sides 50(*c*) and 52(*c*) that terminate at distal end 28(*a*). Leg 26(*b*) includes parallel spaced sides 50(*d*) and 52(*d*) that terminate at distal end 28(*b*). As shown in FIG. 1, both sides 50(*a*), 52(*a*), 50(*b*), 52(*b*), 50(*c*), 52(*c*), 50(*d*), 52(*d*) of each parallel leg 18(*a*), 18(*b*), 26(*a*), 26(*b*) extend beyond the reference radius 46 to the leg's distal end 20(*a*), 20(*b*), 28(*a*), 28(*b*).

Each distal end 20(*a*), 20(*b*), 28(*a*), 28(*b*) extends in a straight line between the sides 50(*a*), 52(*a*), 50(*b*), 52(*b*), 50(*c*), 52(*c*), 50(*d*), 52(*d*) and is perpendicular to the longitudinal axis to provide a squared distal end 20(*a*), 20(*b*), 28(*a*), 28(*b*). Each squared distal end 20(*a*), 20(*b*), 28(*a*), 28(*b*) also preferably includes a beveled surface 54. The squared distal end 20(*a*), 20(*b*), 28(*a*), 28(*b*) could also include an arcuate surface 56 adjacent the beveled surface 54. As shown in the embodiment of FIG. 3, the single lever control assembly 10 has only a plus pattern 38 range of motion. The projections 36 on each parallel leg 18(*a*), 18(*b*), 26(*a*), 26(*b*) prevent any rotation within the 360° range except that movement within the plus pattern.

Figure 4:
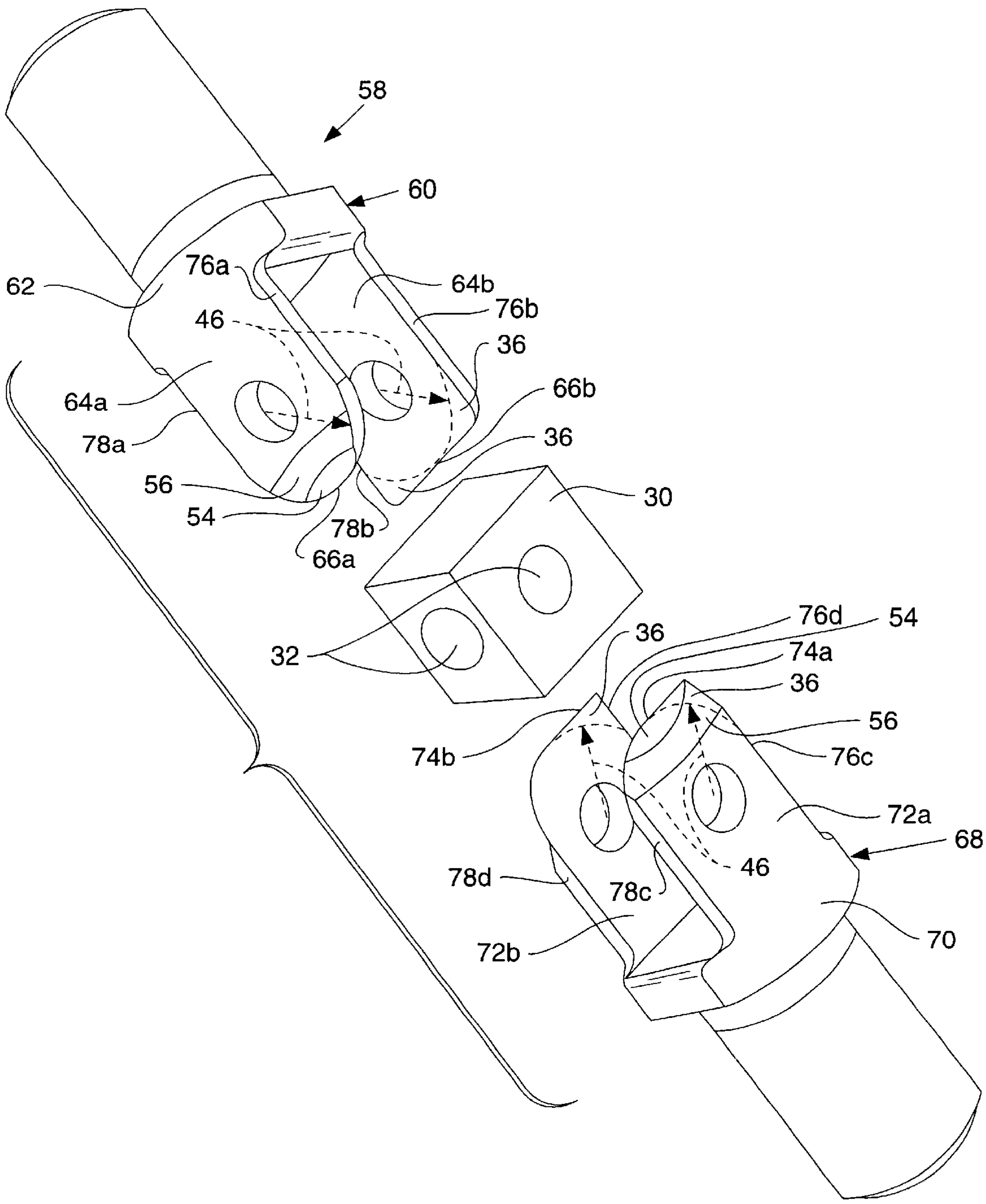
FIG. 4 is an exploded perspective view of another embodiment of the subject invention.
Figure 5:
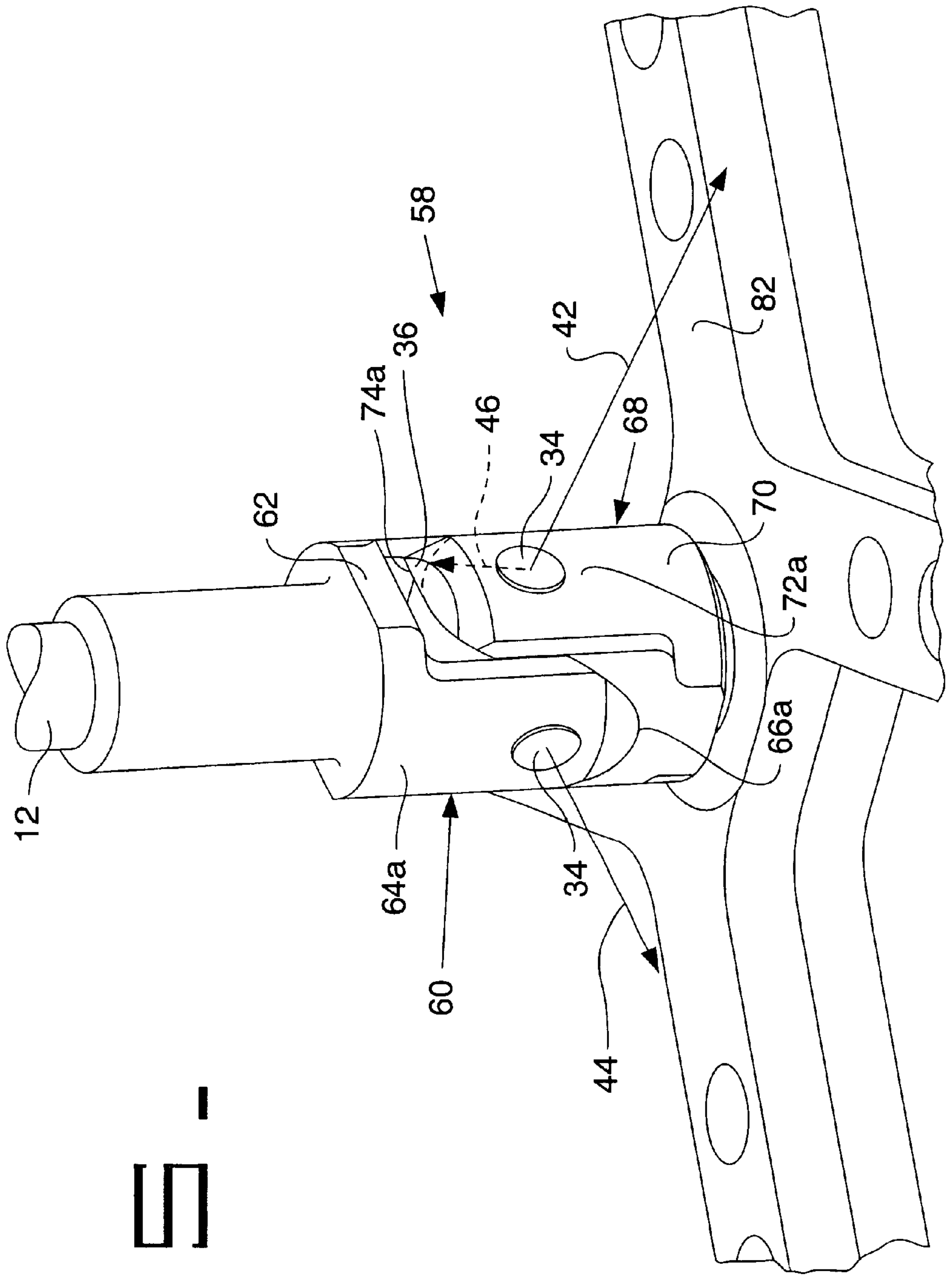
FIG. 5 is a perspective view of the embodiment shown in FIG. 4.

Another embodiment is shown in FIGS. 4 and 5. The assembly 58 comprises a single lever 12 and a first U-shaped member, generally indicated at 60, having a base 62 supporting the lever 12. Parallel legs 64(*a*), 64(*b*) extend along spaced longitudinal axes from the base 62 to respective distal ends 66(*a*), 66(*b*).

The assembly 58 also comprises a second U-shaped member, generally indicated at 68. The second U-shaped member 68 also has a base 70 and parallel legs 72(*a*), 72(*b*) extending along spaced longitudinal axes from the base 70 to respective distal ends 74(*a*), 74(*b*).

As shown in FIG. 4, a pivot block 30 interconnects the parallel legs 64(*a*), 64(*b*), 72(*a*), 72(*b*) for allowing the first U-shaped member 60 to rotate relative to the second U-shaped member 68. Further, the pivot block 30 has a square cross-section and contains two transverse holes 32 for receiving pins 34 that connect the U-shaped members 60, 68 to the pivot block 30.

There is also typically an actuating plate attached to the first U-shaped member 60 (not shown). The actuating plate functions to engage respective valve elements responsive to movement of the single lever 12. Engagement of the valve elements causes performance of desired functions associated with the machinery being controlled by the joystick.

The second U-shaped member 68 is connected to the base member that attaches to the machinery the lever is controlling. The base member is shown as an X-shaped support bracket 82 in FIG. 5.

Each parallel leg 64(*a*), 64(*b*), 72(*a*), 72(*b*) includes parallel spaced sides 76(*a*), 78(*a*), 76(*b*), 78(*b*), 76(*c*), 78(*c*), 76(*d*), 78(*d*) extending from the base 62, 70 to a distal end 66(*a*), 66(*b*), 74(*a*), 74(*b*). In the first U-shaped member 58, leg 64(*a*) includes parallel spaced sides 76(*a*) and 78(*a*) that terminate at distal end 66(*a*). Leg 64(*b*) includes parallel spaced sides 76(*b*) and 78(*b*) that terminate at distal end 66(*b*). In the second U-shaped member 68, leg 72(*a*) includes parallel spaced sides 76(*c*) and 78(*c*) that terminate at distal end 74(*a*). Leg 72(*b*) includes parallel spaced sides 76(*d*) and 78(*d*) that terminate at distal end 74(*b*).

In the subject embodiment 58, the first parallel leg 64(*a*) of the first U-shaped member 60 does not include a projection. Therefore, the distal end 66(*a*) of the first parallel leg 64(*a*) is at the reference radius of clearance 46 and has a semicircular distal end 66(*a*). On the other hand, each side 76(*b*), 78(*b*) of the second parallel leg 64(*b*) extends beyond the reference radius 46 to the leg's distal end 66(*b*). The distal end 66(*b*) extends in a straight line between the sides 76(*b*), 78(*b*) and is perpendicular to the longitudinal axis to provide a squared distal end 66(*b*).

The first side 76(*c*), 76(*d*) of each parallel leg 72(*a*), 72(*b*) of the second U-shaped member 68 extends beyond the reference radius 46 to the leg's distal end 74(*a*), 74(*b*). In other words, each side 76(*c*), 76(*d*) includes a projection 36. The second side 78(*c*), 78(*d*) of each parallel leg 72(*a*), 72(*b*) of the second U-shaped member 68 does not extend beyond the reference radius 46. In other words, the second sides 78(*c*), 78(*d*) do not include projections.

Figure 6:
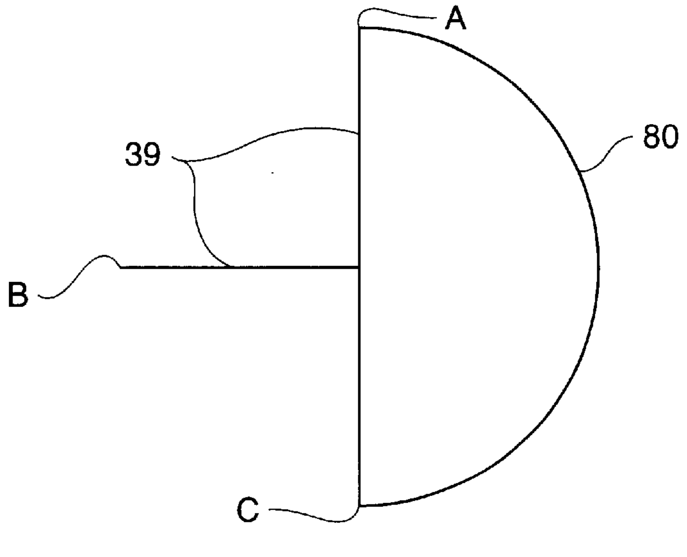
FIG. 6 is a top view of the range of motion of the embodiment shown in FIG. 4.

The projections 36 on the legs 72(*a*), 72(*b*) of the second U-shaped member 68 are adjacent the second parallel leg 64(*b*) of the first U-shaped member 60. As a result of this configuration, the range of motion includes a T-shaped pattern 39 and 180° of unrestricted rotation 80, as shown in FIG. 6. To further facilitate this motion, the distal end 66(*a*), 66(*b*), 74(*a*), 74(*b*) of each parallel leg 64(*a*), 64(*b*), 72(*a*), 72(*b*) also includes a beveled surface 54. The distal ends 66(*a*), 66(*b*), 74(*a*), 74(*b*) could also include an arcuate surface 56 adjacent the beveled surface 54.

Of course, various modifications of this invention would come within the scope of the invention. The main fundamental concept is to limit the rotation of a single lever control assembly due to the inherent design of the mechanism.

INDUSTRIAL APPLICABILITY

In the embodiment shown in FIGS. 1 through 3, the single lever control assembly is restricted to movement in a plus pattern. As shown in FIG. 3, there are four endpoints A, B, C, D to the plus pattern. Further, there is a valve associated and aligned with each endpoint A, B, C, D. Moving the lever to a particular endpoint will actuate the associated valve. Actuation of a particular valve causes performance of a specific function. Typically, the valve is hydraulic.

In the embodiment shown in FIGS. 4 through 6, the single lever control assembly is restricted to a T-shaped pattern and 180° of rotation. As shown in FIG. 6, there are three endpoints to the T-pattern. There is a valve associated and aligned with each endpoint. Moving the lever to a particular endpoint will actuate the associated valve. There is also a valve associated with the point situated at the outer periphery midpoint of the 180° pattern. In other words, there is a valve situated 90° from endpoints A, C and 180° from endpoint B. Further, the lever can move freely within the 180° pattern. As the lever is moved within the 180° several functions can be performed simultaneously. For example, the function associated with the valve corresponding to the midpoint of A and C can be actuated simultaneously with the function associated with endpoint A or C.

The single lever control assembly of the present invention overcomes the disadvantages of the prior art single lever control assemblies because no additional components need to be added to control the shift pattern of the single lever control assembly. The shift pattern of the present invention is predetermined by the design of each component in the single lever control assembly. In other words, the shift pattern is inherent based on the shape of the single lever control assembly components.

Other aspects, objects and advantages of this invention can be obtained from a study of the drawings, the disclosure and the appended claims.

What is claimed is:

1. A single lever control assembly adapted for controlling a machine, said assembly comprising;

a lever, a first U-shaped member having a base supporting said lever and parallel legs extending along spaced longitudinal axes from said base to respective distal ends;

a second U-shaped member having a base and parallel legs extending along spaced longitudinal axes from said base to respective distal ends;

a pivot block interconnecting said parallel legs for allowing said U-shaped members to rotate relative to one another about transverse first and second axes for allowing said parallel legs of said first U-shaped member to rotate about said first axis between said parallel legs of said second U-shaped member and for allowing said parallel legs of said first U-shaped member to rotate about said second axis with said parallel legs of said second U-shaped member therebetween;

a first of said parallel legs of said first U-shaped member having a projection engaging one of said parallel legs of said second U-shaped member to limit rotation of said lever about said second axis; and a first of said parallel legs of said second U-shaped member having a projection engaging one of said legs of said U-shaped member to limit rotation of said lever about said first axis.

2. An assembly as set forth in claim 1 wherein each of said parallel legs includes a reference radius extending about one of said first and second axes which would clear said parallel legs of the opposite U-shaped member in all degrees of rotation between said U-shaped members and said projection extends beyond said reference radius.

3. An assembly as set forth in claim 2 including a plurality of said projections each on a different parallel leg and extending beyond said reference radius.

4. An assembly as set forth in claim 2 wherein said projection extends transverse to at least one of said longitudinal axes.

5. An assembly as set forth in claim 2 wherein said projection extends parallel to at least one of said longitudinal axes.

6. An assembly as set forth in claim 5 wherein each said parallel leg includes parallel spaced sides extending from said base to said distal ends and at least one of said sides extends beyond said reference radius to said distal end.

7. An assembly as set forth in claim 6 wherein both of said sides of one of said parallel legs extend beyond said reference radius to said distal end.

8. An assembly as set forth in claim 7 wherein said distal end extends in a straight line between said sides of said one of said parallel legs.

9. An assembly as set forth in claim 8 wherein said straight line is perpendicular to at least one of said longitudinal axes to provide a squared said distal end.

10. An assembly as set forth in claim 9 wherein each of a plurality of said parallel legs includes a squared said distal end.

11. An assembly as set forth in claim 9 wherein said squared distal end includes a beveled surface.

12. An assembly as set forth in claim 11 wherein said squared distal end includes an arcuate surface adjacent said beveled surface.

13. An assembly as set forth in claim 6 wherein a first side of said parallel leg extends beyond said reference radius to said distal end.

14. An assembly as set forth in claim 13 wherein a second side of said parallel leg does not extend beyond said reference radius to said distal end.

15. An assembly as set forth in claim 6 wherein said distal end is squared at said first side and said distal end is rounded at said second side.

16. An assembly as set forth in claim 15 wherein said distal end includes a beveled surface.

17. An assembly as set forth in claim 16 wherein said distal end includes an arcuate surface adjacent said beveled surface.

* * * * *